United States Patent

[11] 3,533,434

| [72] | Inventor | Robert James Smith, High Wycombe, England |
|---|---|---|
| [21] | Appl. No. | 789,510 |
| [22] | Filed | Jan. 7, 1969 |
| [45] | Patented | Oct. 13, 1970 |
| [73] | Assignee | Rotax Limited, London, England a British company |
| [32] | Priority | Jan. 22, 1968 Great Britain 3,223/68 |

[54] FLUID FLOW CONTROLLING VALVES
10 Claims, 3 Drawing Figs.

[52] U.S. Cl. .................................................. 137/220, 137/625.38, 251/26, 251/63
[51] Int. Cl. ............................................... F16k 31/42
[50] Field of Search .......................................... 137/219, 222, 625.38, 625.39; 251/26, 63, 325

[56] References Cited
UNITED STATES PATENTS
| 2,705,102 | 3/1955 | Slattery | 251/325X |
| 3,145,927 | 8/1964 | Prouty | 137/625.38X |

FOREIGN PATENTS
| 451,418 | 8/1936 | Great Britain | 137/219 |

*Primary Examiner*—Robert G. Nilson
*Attorney*—Holman and Stern

ABSTRACT: A flow control valve comprising a housing having an enlarged portion intermediate its ends, a hollow body mounted within the housing and having a closed end directed to one end of the housing, a piston mounted within the body and having a skirt portion slidable in the opposite end of the housing. There being provided a valve element on the skirt portion and which can cooperate with a seating defined on the body to prevent flow of fluid between the opposite ends of the housing.

Patented Oct. 13, 1970

3,533,434

INVENTOR
Robert James Smith
BY Holman, Glascock
Downing & Seebold
ATTORNEYS

3,533,434

FLUID FLOW CONTROLLING VALVES

This invention relates to fluid flow controlling valves and has for its object to provide such a valve in a simple and convenient form.

A fluid flow controlling valve in accordance with the invention comprises in combination, a hollow elongated housing having an enlarged portion intermediate its ends, a hollow body mounted with clearance within said enlarged portion of the housing, said hollow body having a closed end directed towards one end of the housing and an open end directed towards the other end of the housing, a piston slidable within said hollow body, the piston having an integral skirt portion which is slidable within said other end of the housing, a seating defined about said open end of the hollow body, a valve element defined about said skirt portion intermediate the ends thereof and for cooperation with said seating, a flow aperture defined in said skirt portion intermediate the valve element and the piston and means for causing movement of the piston within the hollow body between a closed position of the valve in which the flow aperture lies within the body and the valve member is upon the seating, and an open position in which the valve element is spaced from the seating and the flow aperture is exposed beyond the body.

Figure 1:
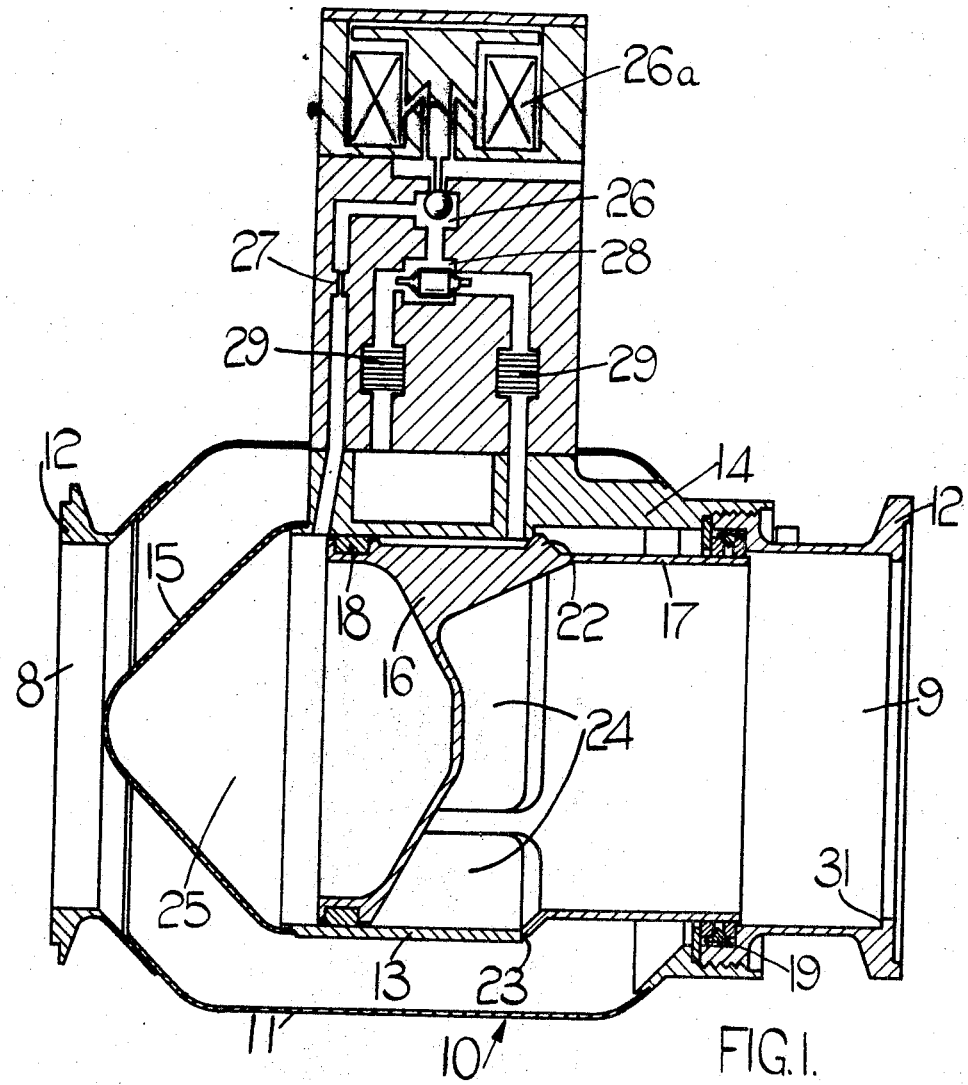
FIG. 1 is a sectional side elevation through one example of valve in accordance with the invention.

Referring to the drawings, there is provided a tubular housing 10 which, intermediate its ends, is provided with an enlarged portion 11. The ends of the housing are adapted for connection in a fluid conduit and for this purpose they may be provided with integral flanges 12 respectively. Mounted with clearance within the enlarged portion of the housing is a hollow cylindrical body 13 this conveniently being mounted by means of a plurality of legs 14 only one of which is shown, secured to the housing. One end of the body is closed by a cap 15 and is presented towards one end 8 of the housing whilst the other end of the body is open and is presented towards the other end 9 of the housing.

Figure 2:
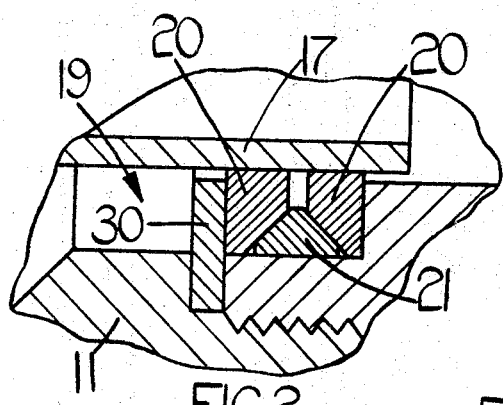
FIG. 2 is a section to an enlarged scale of part of the valve of FIG. 1.

The internal surface of the body 13 defines a cylinder in which is located a piston 16 having an integral skirt portion 17 which extends into the end 9 of the housing. The piston is provided with an annular groove in its periphery in which is located a piston ring 18 which serves to guide the movement of the piston within the body and also acts to define a seal therebetween. Furthermore the skirt portion of the piston is guided within the other end of the housing by a ring 19 which is located in a recess defined in the housing adjacent the enlarged portion thereof. Moreover, the diameter of the skirt portion 17 of the piston is slightly less than the diameter of the portion of the piston which slides within the body. The ring 19 is shown to an enlarged scale in FIG. 2 and the ring 18 is of similar construction. As shown in FIG. 2 the ring 19 comprises a pair of rings 20 which are formed from carbon and these are axially spaced within a slot defined by the body 11. The rings are radially compressed by a ring 21 formed from steel, into contact with the periphery of the skirt 17 of the piston. Furthermore, the contacting surfaces of the rings 20 and 21 are inclined so that the rings 20 will also be urged into contact with the walls of the groove.

Intermediate the ends of the skirt portion 17 there is provided an integral outwardly extending flange 22 which defines a valve element for cooperation with a seating 23 defined about the open end of the hollow body 13. When the flange is in contact with the seating the skirt portion lies within the end 9 of the housing so that flow of fluid through the valve is prevented.

Formed in the skirt of the piston intermediate the flange 22 and the piston ring 18 are three substantially equiangularly spaced flow apertures 24 which when the valve is open permit the flow of fluid between the ends of the housing.

The space defined between the piston 16 and the closed end of the body 13 defines an actuating chamber 25 to which fluid under pressure can be admitted as will be described. The actuating chamber is in communication with a servo valve 26 operated by a solenoid 26a, by which means the actuating chamber may be placed in communication with the atmosphere or alternatively with a source of fluid under pressure. Moreover, intermediate the servo valve 26 and the actuating chamber there is disposed a restricted orifice 27. The source of fluid under pressure is conveniently derived from the fluid which is being controlled by the valve. For this purpose the servo valve is connected by means of a change over valve 28, to whichever end of the housing is at the higher pressure. Moreover, the conduits connecting the change over valve with the ends of the housing incorporate filters 29 respectively.

The operation of the valve will now be described assuming that the end 8 of the housing is connected to the source of fluid under pressure which may be for example the compressor of an aircraft gas turbine engine. The end 9 of the housing is connected to a consumption point which may for instance be equipment controlling the supply of air to the cabin of the aircraft which it is required to pressurize. When the engine is at rest the parts of the valve will have a random position. When the engine is started and with the solenoid deenergized air under pressure will flow through the change over valve 28 and the servo valve 26 to the actuating chamber 25 and the piston 16 will move to open the valve and permit the flow of air therethrough. As the end 9 of the housing becomes pressurized greater pressure is required in the actuating chamber to maintain the flow apertures 24 in the open position. The rate of rise of the pressure in the end 9 of the housing is thereby controlled by the rate of admission of air to the actuating chamber. By suitable selection of the size of the restriction 27 the rate of opening of the valve can be controlled. The extent of movement of the piston is limited by the abutment of the flange 22 with an annular plate 30 defining part of the groove in which the seat 19 is mounted or as in the example illustrated, by abutment of the skirt portion with a surface 31 in the end of the housing.

When the solenoid 26a is energized the actuating chamber 25 is placed in communication with the atmosphere and the piston 16 is moved towards the closed position by two forces. These are derived from the pressure at the end 9 of the housing acting upon the exposed portion of the piston 16 and by the pressure in the end 8 of the housing acting upon the annular area defined by the portion of the skirt portion 17 of reduced external diameter. It is this latter force which maintains the valve in the closed position when the pressure in the end 9 of the housing finally falls to a pressure lower than the pressure in the actuating chamber 25.

The valve may be operated in the reverse manner with the end 9 of the housing 11 connected to the source of air under pressure. In this event when the solenoid 26a is energized and the pressure in the actuating chamber 25 falls to atmospheric pressure the piston 16 will be closed merely by the predominating pressure in the end 9 of the housing. When the solenoid 26a is deenergized the actuating chamber 25 will be connected to the source of fluid under pressure and the piston 16 will be moved towards the open position because the area of the piston within the actuating chamber which is exposed to the fluid under pressure is greater than that which is exposed to the end 9 of the housing.

In the event that the pressure drop across the valve passes from a positive to a negative condition when the valve is open, the valve will remain open since the change over valve will automatically select the higher of the fluid pressures for the actuating chamber.

Figure 3:
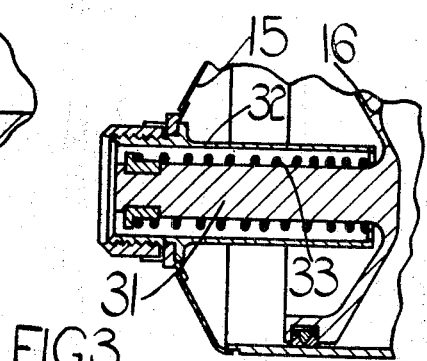
FIG. 3 is a sectional side elevation of part of a modified valve.

If desired the piston 16 may be spring biased towards either the open or the closed position of the valve. As shown in FIG. 3 the piston is biased towards the closed position and for this purpose the piston 16 is provided with a spigot portion 31 which is located with clearance within a tube 32 secured to the cap 15. Disposed intermediate an outward flange on the spigot and an inward flange of the tube is a coiled compression spring 33.

The valve may be used to control the pressure downstream of the valve in addition to the on–off function as described. When the valve is modified for this purpose it is not capable of regulating with the reverse flow as described above. The end 8 of the housing is always connected to the source of fluid under pressure and the servo valve is connected to a point adjacent the end 8 of the housing by way of a filter. Moreover, the aforesaid orifice is replaced by a regulator which can maintain the pressure in the actuating chamber when the solenoid is deenergized, at a predetermined value. When the solenoid is deenergized the force exerted upon the piston 16 due to the pressure within the actuating chamber 25 less the product of the forces exerted by the spring and the pressure in the end 8 of the housing acting on the annular area of the piston, is balanced by the force exerted upon the face of the piston which is exposed to the pressure at the end 9 of the housing and an equilibrium position is attained. If the pressure at the end 9 of the housing decreases then the piston and sleeve are moved to increase the effective size of the flow apertures 24 and the pressure at the other end of the housing increases and a new equilibrium position of the piston and skirt is established. This valve may be modified by the addition of an electrical switch not shown to produce an indication of the presence of fluid under pressure at the end 9 of the housing.

In some circumstances it is required to modify the overall regulating characteristic of the control valve and for this purpose the setting of the regulator may be adjusted so that it provides a higher pressure to the actuating chamber, a relief valve not shown being provided to bleed fluid from the actuating chamber when the pressure therein exceeds a predetermined value.

Although the action of the solenoid when deenergized is to allow opening of the valve it will be appreciated that the servo valve construction may be modified so that closure of the valve occurs when the solenoid is deenergized.

I claim:

1. A fluid flow controlling valve comprising in combination, a hollow elongated housing having an enlarged portion intermediate its ends, a hollow body mounted with clearance within said enlarged portion of the housing, said hollow body having a closed end directed towards one end of the housing and an open end directed towards the other end of the housing, a piston slidable within said hollow body, the piston having an integral skirt portion which is slidable within said other end of the housing, a seating defined about said open end of the hollow body, a valve element defined about said skirt portion intermediate the ends thereof and for cooperation with said seating, a flow aperture defined in said skirt portion intermediate the valve element and the piston and means for causing movement of the piston within the hollow body between a closed position of the valve in which the flow aperture lies within the body and the valve member is upon the seating, and an open position in which the valve element is spaced from the seating and the flow aperture is exposed beyond the body.

2. A valve as claimed in claim 1 including a fluid seal mounted at said other end of the housing and bearing upon the outer periphery of the skirt portion.

3. A valve as claimed in claim 2 in which the diameter of said skirt portion is less than the diameter of the piston thereby defining an annular area upon which the pressure at said one end of the housing can act to maintain the valve in the closed position.

4. A valve as claimed in claim 3 in which said means comprises a servo valve operable to allow fluid under pressure to flow into or to allow fluid to escape from an actuating chamber defined between the piston and the closed end of the hollow body.

5. A valve as claimed in claim 4 in which the fluid under pressure is derived from whichever end of the housing of the valve is at the higher pressure.

6. A valve as claimed in claim 5 including a change over valve for selecting the higher pressure for control by the servo valve.

7. A valve as claimed in claim 6 including a conduit connecting said actuating chamber and said servo valve, means being provided to restrict the flow of fluid through said conduit.

8. A valve as claimed in claim 7 including resilient means biasing the piston and skirt portion towards the closed position.

9. A valve as claimed in claim 4 in which the fluid under pressure is derived from said one end of the housing and a regulator is provided to control the pressure of fluid in the actuating chamber whereby the valve can control the pressure at said other end of the housing.

10. A valve as claimed in claim 9 including resilient means biasing the piston and skirt portion towards the closed position.